United States Patent
Shim et al.

(10) Patent No.: US 10,611,697 B2
(45) Date of Patent: Apr. 7, 2020

(54) REDUCING IMPURITIES IN CERAMIC MATRIX COMPOSITES

(71) Applicants: Rolls-Royce Corporation, Indianapolis, IN (US); Rolls-Royce High Temperature Composites, Inc., Cypress, CA (US)

(72) Inventors: Sungbo Shim, Irvine, CA (US); Kang N. Lee, Strongsville, OH (US)

(73) Assignees: Rolls-Royce High Temperature Composites, Inc., Cypress, CA (US); Rolls-Royce Corporation, Indianapolis, IN (US)

( * ) Notice: Subject to any disclaimer, the term of this patent is extended or adjusted under 35 U.S.C. 154(b) by 409 days.

(21) Appl. No.: 15/299,771

(22) Filed: Oct. 21, 2016

(65) Prior Publication Data

US 2017/0113976 A1 Apr. 27, 2017

Related U.S. Application Data

(60) Provisional application No. 62/244,824, filed on Oct. 22, 2015.

(51) Int. Cl.
*C04B 41/91* (2006.01)
*C04B 41/00* (2006.01)
(Continued)

(52) U.S. Cl.
CPC .............. *C04B 41/91* (2013.01); *C04B 35/80* (2013.01); *C04B 41/009* (2013.01);
(Continued)

(58) Field of Classification Search
CPC ...... C04B 41/91; C04B 35/80; C04B 41/0072; C04B 41/009; C04B 41/459; C04B 41/52;
(Continued)

(56) References Cited

U.S. PATENT DOCUMENTS

| 4,957,811 A | 9/1990 | Benker et al. |
| 5,417,803 A | 5/1995 | Goldstein et al. |

(Continued)

FOREIGN PATENT DOCUMENTS

| EP | 3072867 A2 | 9/2016 |
| GB | 2479165 A | 10/2011 |
| WO | 2014138108 A1 | 9/2014 |

OTHER PUBLICATIONS

Response to the Communication under Rule 70a(1) EPC dated May 3, 2017, and to the Extended Search Report dated Feb. 27, 2017, from counterpart European Application No. 16193745.3, filed Oct. 24, 2017, 7 pp.

(Continued)

*Primary Examiner* — James M Mellott
(74) *Attorney, Agent, or Firm* — Shumaker & Sieffert, P.A.

(57) ABSTRACT

Example techniques may include depositing a slurry on at least a predetermined surface region of a ceramic matrix composite substrate. The slurry may include a solvent and particles comprising at least one of silicon metal or silicon carbide. The slurry may be dried to form a wicking layer on the predetermined surface region. The ceramic matrix composite substrate and the wicking layer may be heated to a temperature of at least 900° C. to wick at least one wickable species from the ceramic matrix composite substrate into the wicking layer. Substantially all of the wicking layer may be removed from the predetermined surface region. Example articles may include a ceramic matrix composite substrate. A wicking layer may be disposed on at least a predetermined surface region of the ceramic matrix composite substrate. The wicking layer may include at least one wicked species wicked from the ceramic matrix composite substrate.

17 Claims, 2 Drawing Sheets

(51) Int. Cl.
*C04B 41/45* (2006.01)
*C04B 41/89* (2006.01)
*C04B 41/52* (2006.01)
*F01D 5/28* (2006.01)
*C04B 35/80* (2006.01)
*C04B 41/81* (2006.01)

(52) U.S. Cl.
CPC ........ *C04B 41/0072* (2013.01); *C04B 41/459* (2013.01); *C04B 41/52* (2013.01); *C04B 41/81* (2013.01); *C04B 41/89* (2013.01); *F01D 5/288* (2013.01); *C04B 2235/72* (2013.01); *F05D 2300/2102* (2013.01); *F05D 2300/6033* (2013.01)

(58) Field of Classification Search
CPC ..... C04B 41/81; C04B 2235/72; F01D 5/288; F05D 2300/2102; F05D 2300/6033
See application file for complete search history.

(56) References Cited

U.S. PATENT DOCUMENTS

| | | |
|---|---|---|
| 5,494,439 A | 2/1996 | Goldstein et al. |
| 5,840,221 A * | 11/1998 | Lau .................. B28B 1/265 264/29.7 |
| 6,521,535 B2 | 2/2003 | Sabia |
| 6,555,173 B1 | 4/2003 | Forsythe |
| 7,011,888 B2 | 3/2006 | Bauer et al. |
| 7,053,411 B2 | 5/2006 | Haerle et al. |
| 7,696,103 B2 | 4/2010 | Shive et al. |
| 7,888,685 B2 | 2/2011 | Shive et al. |
| 8,058,174 B2 | 11/2011 | Narendar et al. |
| 2004/0258839 A1 | 12/2004 | Hong et al. |
| 2006/0141154 A1 | 6/2006 | Thebault |
| 2009/0297718 A1 | 12/2009 | Saffari-nour |
| 2013/0167374 A1* | 7/2013 | Kirby .................. C04B 35/64 29/888.02 |
| 2014/0170318 A1 | 6/2014 | Luthra |
| 2015/0175476 A1 | 6/2015 | Diss et al. |

OTHER PUBLICATIONS

Extended Search Report from counterpart European Application No. 16193745.3, dated Feb. 27, 2017, 12 pp.
Examination Report from counterpart European Application No. 16193745.3, dated Jan. 25, 2019, 9 pp.
Response to Extended Search Report dated Jan. 25, 2019, from counterpart European Application No. 16193745.3, filed Jun. 24, 2019, 25 pp.
Summons to Attend Proceedings Pursuant to Rule 115(1) EPC, dated Dec. 10, 2019 for counterpart EP 16193745.3 application, 4 pp.

* cited by examiner

# REDUCING IMPURITIES IN CERAMIC MATRIX COMPOSITES

RELATED APPLICATIONS

This application claims the benefit of U.S. Provisional Application No. 62/244,824 filed Oct. 22, 2015, which is incorporated herein by reference in its entirety.

TECHNICAL FIELD

The disclosure relates to techniques for reducing impurities in ceramic matrix composites.

BACKGROUND

While ceramics may be used for aerospace, automotive, aviation, and industrial applications due to their desirable high temperature properties, the brittleness and resulting unreliability of ceramics may pose shortcomings. A ceramic matrix composite (CMC) is a fiber-reinforced ceramic structure that features ceramic matrices toughened by incorporating reinforcement materials, such as fibers. The strength added by the reinforcing fibers may help maintain the structural integrity of parts formed of CMCs, for example, when subjected to strain or shear. Thus, CMC materials may be useful in a variety of contexts where mechanical and thermal properties are important. For example, components of high temperature mechanical systems, such as gas turbine engines, may be made from CMCs.

SUMMARY

In some examples, a technique may include depositing a slurry on at least a predetermined surface region of a ceramic matrix composite substrate. The slurry includes a solvent and particles comprising at least one of silicon metal or silicon carbide. The technique may include drying the slurry to form a wicking layer on the predetermined surface region. The technique may include heating the ceramic matrix composite substrate and the wicking layer to a temperature of at least 900° C. to wick at least one wickable species from the ceramic matrix composite substrate into the wicking layer. The technique may include removing substantially all of the wicking layer from the predetermined surface region.

In some examples, an article may include a ceramic matrix composite substrate. A wicking layer may be disposed on at least a predetermined surface region of the ceramic matrix composite substrate. The wicking layer may include particles including at least one of silicon metal or silicon carbide, and at least one wicked species wicked from the ceramic matrix composite substrate.

The details of one or more examples are set forth in the accompanying drawings and the description below. Other features, objects, and advantages will be apparent from the description and drawings, and from the claims.

DETAILED DESCRIPTION

Impurities and unwanted elements may be introduced to CMCs from transient phases, raw materials, and process equipment. Impurities and unwanted elements may form secondary phases which may degrade the environmental and mechanical performance of CMCs. The disclosure describes example techniques for reducing impurities in processed CMCs and example articles including processed CMCs with reduced impurities.

In general, the disclosure describes techniques for reducing impurities in a CMC by heat treating a densified CMC part with a porous layer including silicon or silicon carbide on a CMC surface of the CMC in air atmosphere. Prior to heat treatment, a slurry including silicon or silicon carbide particles is applied on the CMC surface and dried to form a porous layer. During heat treatment, impurities in the CMC may react with silicon to form Si-containing glass or low melting liquid phases. The Si-containing glass or low melting liquid phases may function as a transport medium for the impurities, and may facilitate wicking of the impurities into the porous layer by capillary force. After heat treatment, the porous surface layer, now including impurities from the CMC, may be removed, leaving the CMC with reduced impurity content.

By reducing the amount of impurities and unwanted elements in the CMC, degradation in the environmental and mechanical performance of the treated CMC due to impurities may be reduced. For example, some elements, such as boron, may be detrimental to oxidation resistance of Si-based CMCs. A CMC may include an environmental barrier coating (EBC) that reduces reaction of environmental species with the underlying CMC. In some examples, the EBC may include a bond coat that includes silicon and an overlying oxide-based layer. Boron, if present in a CMC may diffuse into the bond coat and increase the growth rate of silica scale on the bond coat. In some cases, the presence of boron in the bond coat that includes silicon may increase the growth rate of silica scale by more than an order of magnitude. Excess silica scale may increase a susceptibility of the EBC to cracking and spallation. Therefore, reducing boron from CMCs may improve the oxidation resistance of a bond coat including silicon and increase the life of the EBC.

Figure 1:
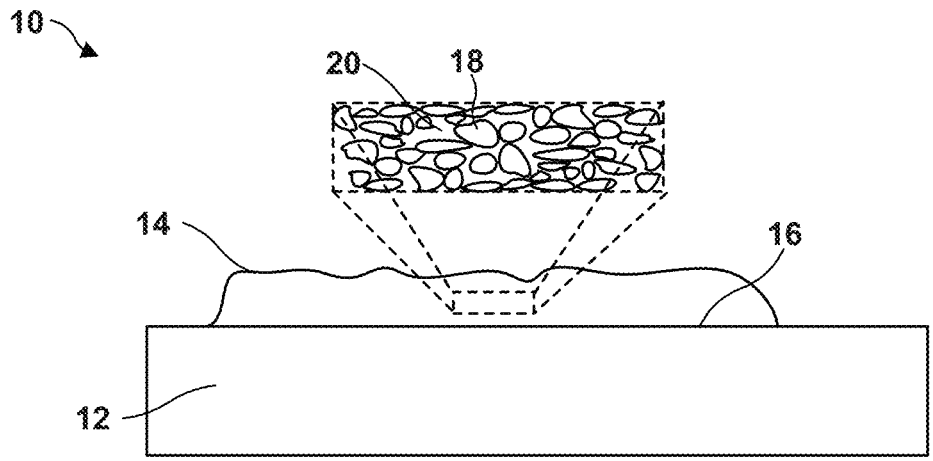
FIG. 1 is a conceptual cross-sectional view of an example article including CMC and a wicking layer.

FIG. 1 is a conceptual cross-sectional view of an example article 10 including a CMC 12 and a wicking layer 14. In some examples, article 10 may be a component of a high temperature mechanical system. For example, article 10 may be a seal segment, a blade track, an airfoil, a blade, a vane, a combustion chamber liner, or the like, of a gas turbine engine.

Article 10 may include CMC substrate 12. CMC substrate 12 may include reinforcing component embedded in a ceramic matrix, for example, a SiC—SiC composite or a C-SiC composite. The ceramic matrix may include, for example, SiC, $Si_3N_4$, $Al_2O_3$, aluminosilicate, silica, silicon metal, carbon, or the like. CMC substrate 12 may include reinforcement components such as continuous fibers, discontinuous fibers, short fibers, whiskers, particulates, platelets, or other forms of the reinforcing component, including for example, SiC, $Si_3N_4$, $Al_2O_3$, aluminosilicate, $SiO_2$, or the like. CMC substrate 12 may include a densified ceramic composite component, for example a ceramic composite component prepared by techniques including chemical vapor deposition/chemical vapor infiltration, slurry impregnation, liquid phase infiltration, silicon melt infiltration, hot press sintering, or polymer infiltration and pyrolysis. CMC substrate 12 may initially include impurities or unwanted species including one or more of Al, B, Mg, Fe, or Ca.

In accordance with one or more techniques of the disclosure, wicking layer 14 may be used to remove at least some of the impurities or unwanted species from CMC substrate 12. In some examples, to form wicking layer 14, a layer of a slurry (not shown) may be deposited on a predetermined surface region 16 of CMC substrate 12. For example, predetermined surface region 16 may include some or all of an outer surface of CMC substrate 12. The slurry may include a liquid carrier (not shown) and particles 18. Particles 18 may ultimately form wicking layer 14 after removal of the liquid carrier. The liquid carrier may include water, ethanol, isopropyl alcohol, methyl ethyl ketone, toluene, or the like.

Particles 18 may include, consist essentially of, or consist of silicon metal, silicon carbide, or both. Particles 18 may have average particle sizes ranging between about 1 μm and about 50 μm. In some examples, particles 18 may include particles of substantially the same particle size. In other examples, particles 18 may include particles of varying sizes within a predetermined range of particle sizes. For example, a particle size distribution may be selected for particles 18 that promotes packing of particles 18 in wicking layer 14. In some examples, particles 18 may include a first plurality of particles having a first average particle size, and a second plurality of particles having a second average particle size. In some examples, particles 18 may include substantially spherical, lenticular, or polygonal particles. In some examples, particles 18 may include particles having irregular shapes.

The slurry may contain between about 10 vol. % and about 80 vol. % of particles 18, based on the total volume of the slurry. The slurry may also include one or more optional additives. The additives may be used to tailor or alter the properties of the first slurry. In some examples, the one or more optional additives may include a binder (e.g. polyethylene glycol, acrylate co-polymers, latex co-polymers, polyvinyl pyrrolidone co-polymers, polyvinyl butyral, or the like), a dispersant (e.g., ammonium polyacrylate, polyvinyl butyral, a phosphate ester, polyethylene imine, BYK® 110 (available from Byk USA, Inc., Wallingford Conn.), or the like), or the like. The slurry may be deposited by spraying, dip coating, transfer molding, painting, or the like. In some examples, article 10 may be disposed in a mold to facilitate depositing the slurry.

The deposited slurry may be dried to form wicking layer 14 formed of the solid contents of the slurry on predetermined surface region 16. In the course of drying, the liquid carrier may evaporate from the slurry to leave particles 18 in wicking layer 14. As shown in FIG. 1, in some examples, the carrier departing from the slurry may leave pores 20 in wicking layer 14 between particles 18. Pores 20 may include interconnected or disconnected voids of regular or irregular dimensions. Thus, wicking layer 14 may be porous. Pores 20 may include pores that are eventually connected to the predetermined surface region 16. Once the slurry has been dried to remove the liquid carrier and form wicking layer 14, wicking layer 14 may be used to wick impurities from CMC substrate 12 to increase the purity of CMC substrate 12. Improving the purity of CMC substrate 12 by wicking impurities into wicking layer 14 may reduce the effect of impurities on operating properties of CMC substrate 12 or on properties of coatings applied to CMC substrate 12, for example, barrier coatings.

As described with reference to FIG. 2 below, impurities may be removed from CMC substrate 12 by heating wicking layer 14 to cause impurities to wick from CMC substrate 12 into wicking layer 14, which may later be removed from CMC substrate 12.

Figure 2:
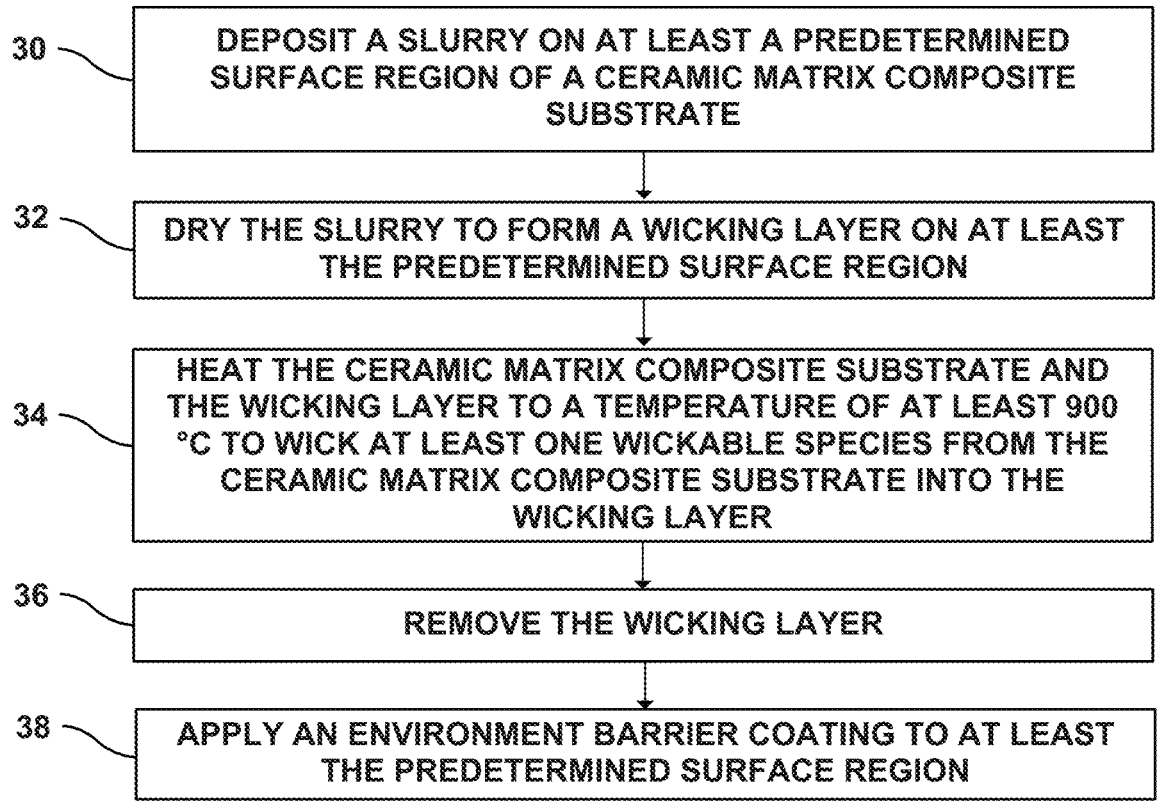
FIG. 2 is a flow diagram illustrating an example technique for reducing impurities in CMCs.

FIG. 2 is a flow diagram illustrating an example technique for reducing impurities in a CMC. While the example technique is described with reference to article 10 of FIG. 1, the example technique may be implemented in processing other example articles. The example technique may include depositing a slurry on at least predetermined surface region 16 of CMC substrate 12 (30). As described above, CMC substrate 12 may be densified, e.g., may include reinforcement material and matrix material. In some examples, CMC substrate 12 may be substantially fully densified before application of the slurry, i.e., may not undergo any further densification during or after application of the slurry. The slurry may include a solvent and particles 18 comprising at least one of silicon metal or silicon carbide.

The example technique may include drying the slurry to form wicking layer 14 on at least predetermined surface region 16 (32). The drying may be performed at room temperature, or at a predetermined drying temperature. For example, the predetermined drying temperature may be between about 50° C. and about 150° C. Wicking layer 14 may have a thickness between about 25 μm to about 1000 μm.

After drying wicking layer 14, CMC substrate 12 and wicking layer 14 may be heated to a temperature of at least 900° C. (34). The heating may result in the wicking of at least one wickable species from CMC substrate 12 into wicking layer 14. For example, CMC substrate 12 and wicking layer 14 may be heated to a temperature of at least about 900° C. for a predetermined period of time, such as between about 1 hour and about 10 hours. In some examples, the temperature to which wicking layer 14 is heated may be maintained less than a threshold temperature, for example, less than about 1400° C. Limiting the temperature of CMC substrate 12 in this way may reduce or substantially prevent damage or negative impact to CMC substrate 12. For example, limiting the temperature of CMC substrate 12 to below a threshold temperature may reduce or substantially avoid damaging reinforcing fibers within CMC substrate 12. In some examples, the selected temperature and time duration of the heat treatment may depend on one or more of average particle size of particles 18, thickness of wicking layer 14, the area of predetermined surface region 16, the composition of CMC substrate 12 or wicking layer 14, the nature and concentration of the wickable species in CMC substrate 12, and the geometric dimensions of CMC substrate 12. For example, the time duration may be affected by the average particle size of particles 18, since the average particle size may affect the porosity of wicking layer 14, and therefore the rate of wicking of the glassy or low melting liquid phase into wicking layer 14 from CMC substrate 12. A relatively higher time duration may be used when the thickness of wicking layer 14 is relatively higher, to allow the glassy or low melting liquid phase to occupy a relatively larger volume within wicking layer 14. A relatively higher temperature may be used when the nature or concentration of the impurities results in an increase in the melting point of the glassy or low melting liquid phase, for example, by their effect on colligative properties of the liquid phase. CMC substrate 12 with irregular geometric dimensions, for example, CMC substrate 12 presenting protrusions and curves may require a longer duration of treatment to allow impurities to be wicked from substantially an entire volume of CMC substrate 12 compared to the duration of heating required for CMC substrate 12 with substantially uniform geometric dimensions, for example, a width that remains substantially the same along an axis.

The heating may be performed in an atmosphere containing oxygen. In some examples, the heating may be performed in an atmosphere of substantially pure oxygen. In other examples, the heating may be performed in an atmosphere containing less than 100% oxygen. For example, the heating may be performed in an atmosphere containing air. In some examples, the heating may be performed in an atmosphere including an oxidizing species other than oxygen. Without being bound by theory, heating in an oxidizing atmosphere may promote formation of silicon glass or low melting liquid phase and migration of wickable species in the glass or the liquid phase.

The heating of CMC substrate 12 and wicking layer 14 may cause formation of at least one of a silicon glass or a low melting liquid phase by reaction of silicon with the one or more wickable species in CMC substrate 12. The silicon glass or low melting liquid phase may be wicked into wicking layer 14, carrying the one or more wickable species from CMC substrate 12 into wicking layer 14. Without being bound by theory, the porosity of wicking layer 14 may facilitate the transport of the glass or the liquid phase from CMC substrate 12. For example, the porosity or an interconnected void structure may promote diffusion or capillary action. Thus, on heating wicking layer 14 and CMC substrate 12, at least one wickable species in CMC substrate 12 may be wicked from the CMC substrate 12 into wicking layer 14. For example, the one or more wickable species may include impurities or unwanted species including at least one of Al, B, Mg, Fe, or Ca. The heating may thus result in reduction of wickable species, for example, impurities or unwanted species, from CMC substrate 12.

The example technique may include removing substantially all of wicking layer 14 from predetermined surface region 16 (36). After the heating, and after the wickable species have been wicked from CMC substrate 12 into wicking layer 14, wicking layer 14 may be substantially fully removed from CMC substrate 12. For example, wicking layer 14 may be removed by grit blasting, abrading, machining, laser ablation, or other physical, mechanical, or thermal techniques. In some examples, wicking layer 14 may be allowed to sufficiently cool before removing wicking layer 14.

A CMC substrate 12 with reduced impurities may thus be obtained after removing substantially all of wicking layer 14. In some examples, after removing wicking layer 14, a coating, such as an environment barrier coating (EBC) may be applied to at least a portion of CMC substrate 12, such as predetermined surface region 16 (38), after step 36. The EBC (not shown) may provide environmental protection, thermal protection, and/or calcia-alumina-magnesia-silicate (CMAS)-resistance to CMC substrate 12. In some examples, the EBC may include at least one of a rare earth oxide, a rare earth silicate, an aluminosilicate, or an alkaline earth aluminosilicate. For example, an EBC layer may include mullite, barium strontium aluminosilicate (BSAS), barium aluminosilicate (BAS), strontium aluminosilicate (SAS), at least one rare earth oxide, at least one rare earth monosilicate ($RE_2SiO_5$, where RE is a rare earth element), at least one rare earth disilicate ($RE_2Si_2O_7$, where RE is a rare earth element), or combinations thereof. The oxidation resistance of a bond coat including silicon and the life of the EBC may be improved by removing impurities such as boron from CMC substrate 12 as described in examples above.

EXAMPLES

Example 1

Figure 3:
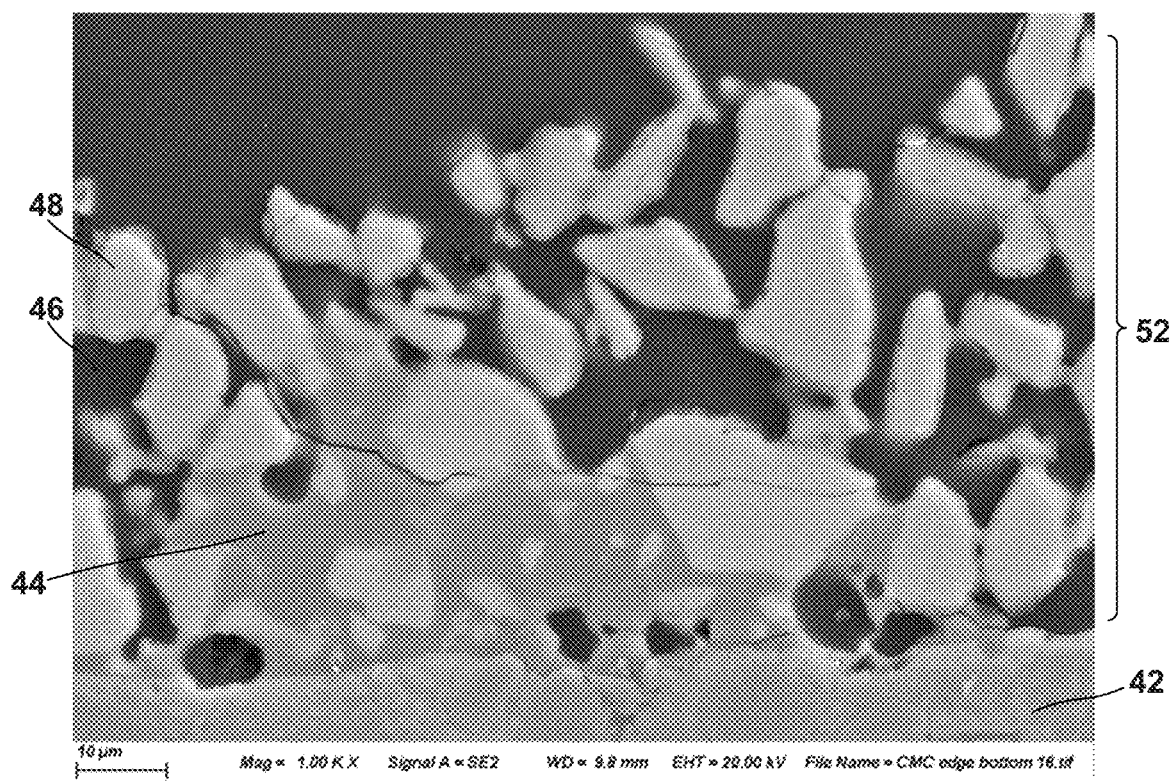
FIG. 3 is an SEM micrograph showing a glass phase wicked into a wicking layer after heat treatment.

A slurry consisting of Si powder and ethanol was made and stirred for about 20 minutes. A 1 inch×1 inch CMC coupon was dip-coated with Si slurry and dried at about 70° C. for about 1 hour. The coupon was heat treated at about 1200° C. for about 5 hours in air atmosphere. The Si layer was removed by grit blasting. A 0.25 inch×0.25 inch section was cut out from the coupon and pulverized for glow discharge mass spectroscopy analysis. Additional specimens were taken from CMC panel right next to the heat treated specimen as the baseline for GDMS analysis. FIG. 3 is an SEM micrograph showing a glass phase 44 wicked from a CMC substrate 42 into a wicking layer 52 after heating. Wicking layer 52 includes particles 48 separated by pores 46.

Figure 4:
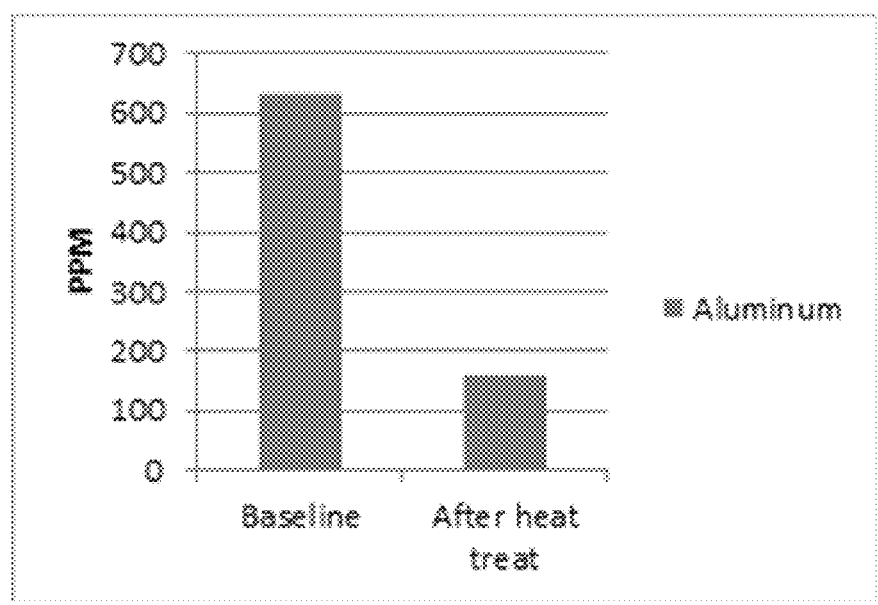
FIG. 4 is a chart comparing impurity content in CMCs before and after performing an example technique.

FIG. 4 is a chart comparing aluminum impurity content in the CMC before and after applying the slurry and performing the heat treatment. The GDMS analysis showed that Al content in CMC was significantly reduced.

Various examples have been described. These and other examples are within the scope of the following claims.

The invention claimed is:

1. A method comprising:
   depositing a slurry on at least a predetermined surface region of a ceramic matrix composite substrate, wherein the slurry comprises a solvent and particles comprising at least one of silicon metal or silicon carbide;
   drying the slurry to form a wicking layer on the predetermined surface region; heating the ceramic matrix composite substrate and the wicking layer to a temperature of at least 900° C. to wick at least one wickable species from the ceramic matrix composite substrate into the wicking layer, wherein the heating is performed in an atmosphere containing oxygen; and
   removing at least a portion of the wicking layer from the predetermined surface region.

2. The method of claim 1, wherein the particles have average particle sizes ranging between 1 μm and 50 μm.

3. The method of claim 2, wherein the particles include a first plurality of particles having a first average particle size, and a second plurality of particles having a second average particle size different from the first average particle size.

4. The method of claim 1, wherein the slurry contains between 10 vol. % and 80 vol. % of the particles, based on the total volume of the slurry.

5. The method of claim 1, wherein the wicking layer has a thickness between 25 μm to 1000 μm.

6. The method of claim 1, wherein the atmosphere containing oxygen comprises air.

7. The method of claim 1, wherein the wickable species comprises at least one of Al, B, Mg, Fe, or Ca.

8. The method of claim 1, wherein the heating is performed for a time between 1 hour and 10 hours.

9. The method of claim 1, wherein the temperature is less than 1400° C.

10. The method of claim 1, wherein heating the ceramic matrix composite substrate and the wicking layer to a temperature of at least 900° C. causes formation of at least one of a silicon glass or a low melting liquid phase by reaction of silicon with the at least one wickable species and transport of the at least one of the silicon glass or the low melting liquid phase from the densified ceramic matrix composite into the wicking layer.

11. The method of claim 1, wherein the ceramic matrix composite comprises a SiC—SiC matrix composite, and wherein the SiC—SiC matrix composite includes fewer impurities after heating the ceramic matrix composite substrate and the wicking layer to a temperature of at least 900° C. than before the ceramic matrix composite substrate and the wicking layer to a temperature of at least 900° C.

12. The method of claim 1, wherein the removing the wicking layer comprises grit blasting the wicking layer.

13. The method of claim 1, further comprising, after removing the at least the portion of the wicking layer, applying an environment barrier coating to at least the predetermined surface region.

14. The method of claim 13, wherein the environment barrier coating comprises a rare earth silicate.

15. The method of claim 1, wherein the wickable species comprise boron.

16. The method of claim 1, wherein removing the at least the portion of the wicking layer from the predetermined surface region comprises removing all of the wicking layer from the predetermined surface region.

17. A method comprising:
depositing a slurry on at least a predetermined surface region of a ceramic matrix composite substrate, wherein the slurry comprises a solvent and particles comprising at least one of silicon metal or silicon carbide;
drying the slurry to form a wicking layer on the predetermined surface region;
heating the ceramic matrix composite substrate and the wicking layer to a temperature of at least 900° C. to wick at least one wickable species from the ceramic matrix composite substrate into the wicking layer, wherein the heating is performed in an atmosphere containing air; and
removing at least a portion of the wicking layer from the predetermined surface region.

* * * * *